(12) United States Patent
Lewis (10) Patent No.: US 7,318,174 B2
(45) Date of Patent: Jan. 8, 2008

(54) SYSTEMS, METHODS, AND COMPUTER READABLE MEDIUM FOR ANALYZING MEMORY

(75) Inventor: Michael Dwayne Lewis, Sanford, NC (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 10/907,541

(22) Filed: Apr. 5, 2005

(65) Prior Publication Data

US 2006/0225044 A1    Oct. 5, 2006

(51) Int. Cl.
*G06F 11/00* (2006.01)
(52) U.S. Cl. .......................................... 714/37; 714/29
(58) Field of Classification Search ................ 714/37, 714/29, 28, 42, 718, 100; 711/100
See application file for complete search history.

(56) References Cited

U.S. PATENT DOCUMENTS

| | | | |
|---|---|---|---|
| 5,101,494 A * | 3/1992 | Bilski et al. ................. | 717/127 |
| 5,555,389 A | 9/1996 | Satoh et al. | |
| 5,559,980 A * | 9/1996 | Connors et al. ............. | 711/100 |
| 5,619,685 A | 4/1997 | Schiavone | |
| 6,226,761 B1 | 5/2001 | Berstis | |
| 6,430,707 B1 | 8/2002 | Matthews et al. | |
| 6,526,047 B1 * | 2/2003 | Hansson ..................... | 370/360 |
| 6,560,772 B1 | 5/2003 | Slinger | |
| 6,615,364 B1 | 9/2003 | Nagasuka et al. | |
| 6,671,826 B1 | 12/2003 | Joshi et al. | |
| 6,681,348 B1 | 1/2004 | Vachon | |
| 6,701,457 B2 | 3/2004 | Reynolds et al. | |
| 6,789,216 B2 | 9/2004 | Zagorski et al. | |
| 6,795,963 B1 | 9/2004 | Andersen et al. | |
| 6,948,010 B2 * | 9/2005 | Somers et al. ............... | 710/23 |
| 2002/0116555 A1 * | 8/2002 | Somers et al. ............... | 710/26 |

FOREIGN PATENT DOCUMENTS

| | | |
|---|---|---|
| JP | 4229343 | 8/1992 |
| JP | 11272516 | 10/1999 |

OTHER PUBLICATIONS

IBM Technical Disclosure Bulletin, vol. 30, No. 10, Oct. 1996, pp. 151-152.
IBM Technical Disclosure Bulletin, vol. 21, No. 11, Apr. 1997, pp. 4658-4659.
IBM Docket FR920010043US1, "A Method and System for Tracing and Displaying Execution of Nested Functions", filed Sep. 5, 2002, Appl. No. 10/235,599.

* cited by examiner

*Primary Examiner*—Dieu-Minh Le
(74) *Attorney, Agent, or Firm*—Jeanine Ray-Yarletts, Esq; Steven M. Greenberg, Esq.; Carey Rodriguez Greenberg & Paul LLP (57) ABSTRACT

Techniques are provided for expanding the functionality of live memory analysis commands to analyze a memory dump or other differing memory types. To this end, a live memory command which normally analyzes live memory is modified to invoke a virtual machine. Live memory commands, in general, have different code segments including a locate code segment which, when executed, locates a first control block in live memory. The locate code segment of the live memory command is modified to invoke a virtual machine for locating a second control block in a memory dump. When the modified code segment is executed, the second control block from a memory dump is accessed.

16 Claims, 5 Drawing Sheets

```
***********************************************************
*        LOCATE THE FIRST SUBSYSTEM SSCVT.                *
***********************************************************
         SPACE 1
210 ──→  $IPCS TYPE=START
         L     R8,CVTPTR              --> CVT          ⎫
         L     R8,CVTJESCT-CVT(,R8)       JESCT        ⎬ 220
         L     R8,JESSSCT-JESCT(,R8)      JES2 SSCVT   ⎭
210 ──→  $IPCS TYPE=END,RETURN=R8
         USING SSCT,R8
         SPACE 3
***********************************************************
*        IF WE REQUESTED A SPECIFIC SSCVT, MAKE SURE      *
*        WE ARE AT THE ONE WE WANT.                       *
***********************************************************
         SPACE 1
MAIN100  ICM   R1,15,SUBSNAME    USE SPECIFY A NAME?
         BZ    MAIN110           NO.  PROCESS ENTIRE LIST
         CLC   SUBSNAME,SSCTSNAM YES. AT CORRECT SSCVT?
         BNE   MAIN120           NO.  BYPASS THIS ONE           ⎫
         SPACE 3                                                ⎬ 250
***********************************************************
*        DESCRIBE CURRENT MAIN SSCVT ENTRY.               *
***********************************************************
         SPACE 1
MAIN110  $CALL DESCRIBE           DESCRIBE MAIN ENTRY
         SPACE 3
***********************************************************
*        LOOP FOR NEXT SSCVT ENTRY.                       *
***********************************************************
         SPACE 1
MAIN120  $IPCS TYPE=START  ←── 240
         L     R8,SSCTSCTA           --> NEXT SSCVT OR 0
230 ──→  $IPCS TYPE=END,RETURN=R8  ←──────── 240
         LTR   R8,R8                  SSCVT ADDRESS NULL?
         BNZ   MAIN100                NO.  DO ENTIRE LIST
```

SYSTEMS, METHODS, AND COMPUTER READABLE MEDIUM FOR ANALYZING MEMORY

FIELD OF THE INVENTION

The present invention generally relates to systems, methods, and computer readable media for analyzing memory, and more particularly, to advantageous systems, methods, and computer readable medium for expanding the functionality of live memory analysis commands to analyze a memory dump.

BACKGROUND OF THE INVENTION

The International Business Machine Corporation's (IBM) interactive problem control system (IPCS) is a tool provided with the IBM Multiple Virtual Space (MVS), OS/390, and z/OS memory operating systems to aid in diagnosing software failures. IPCS provides formatting and analysis support for memory dumps and traces produced by the operating system, other program products, and applications that run on the operating systems. A dump occurs during an abnormal end of a program or ABEND. If such a system error occurs, data in memory is written to disk storage, for example, dumped. IPCS is used to format and analyze unformatted dumps. When unformatted dump data sets are submitted, IPCS simulates dynamic address translation (DAT) and other storage management functions to recreate the system environment at the time of the dump. IPCS reads the unformatted dump data and translates it into words. For example, IPCS can identify jobs with error return codes, resource contention in the system, and control block overlays.

To utilize IPCS, a system administrator must enter a series of specialized commands to perform dump and trace analysis, such as analyze, format, view, retrieve, and copy dump and trace data, and to maintain an IPCS session. Details of the IPCS program are described in the IBM publication "OS/390 MVS Interactive Problem Control System (IPCS) User's Guide," IBM document no. GC28-1756-00 (IBM Copyright 1996), which is incorporated herein by reference in its entirety.

The documented mechanism for creating user-written, non-system-programmer-installed analysis routines for expanding the functionality of IPCS is to invoke the time share option (TSO) variable storage subcommands supplied with IPCS, such as the "EVAL" and "EVALSYM" subcommands. TSO command list (CLISTS) or restructured extended executor (REXX) executables (EXECS) are the programming language environments in which those supplied IPCS subcommands are written. However, neither of those languages is particularly suited for accessing the variety of data types supported in live memory of an IBM mainframe. Due to the limitations of TSO CLISTS and REXX, it is a cumbersome task to construct a user-developed TSO CLIST or REXX EXEC to run through a control block chain in live memory, and then to provide a complex analysis of the memory's state. If written, future support of such a user-developed CLIST or EXEC is problematical.

Native mainframe Assembly and PL/X languages represent a much more suitable common programming platform to examine data in a memory dump and to carry out a complicated analysis task on live memory. However, the IBM supplied subcommands such as EVAL and EVALSYM, do not lend themselves to direct invocation either from mainframe Assembly, PL/X, or other third generation language environments.

IBM, various other equipment manufacturers(OEM), computer users, software developers, and the like develop and distribute an assortment of TSO live-memory analysis commands also referred to as native TSO commands. Many of the TSO live-memory analysis commands that already exist perform functions which are similar to existing IPCS commands. Other existing TSO live-memory analysis commands perform analyses that would be useful for problem resolution, if they could be directed at the memory represented by a memory dump. The TSO live-memory analysis commands currently examine live mainframe memory to locate a control block structure, and then perform analysis of the state of a user-defined or system structure found in live mainframe memory. Since the existing catalog of TSO live-memory commands may not easily be converted into IPCS commands, the existing TSO live-memory commands may not be easily leveraged into reading and analyzing a memory dump. In addition, the majority of TSO live-memory commands are written in mainframe Assembly or PL/X which, as mentioned above, IPCS does not support. It should be noted that the term "live memory" as used herein is memory in a computer system which is currently allocated for use by a process running on the computer system.

SUMMARY OF THE INVENTION

The present invention recognizes the need to create software which acts as a liaison between TSO live memory commands and TSO variable storage commands so that TSO live memory commands may analyze memory dumps or other memory types other than live memory.

Among its several aspects, the present invention provides a system, method, and computer readable media for analyzing a memory dump utilizing a modified live memory analysis command. To this end, a live memory command which normally analyzes live memory is modified to invoke a virtual machine. Live memory commands, in general, have different code segments including a locate code segment which, when executed, locates a first control block in live memory. The locate code segment of the live memory command is modified to invoke a virtual machine for locating a second control block in a memory dump. When the modified code segment is executed, the second control block from a memory dump is accessed.

A more complete understanding of the present invention, as well as further features and advantages of the invention, will be apparent from the following Detailed Description and the accompanying drawings.

DETAILED DESCRIPTION

The present invention will now be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

As will be appreciated by one of skill in the art, the present invention may be embodied as methods, systems, or computer program products. Accordingly, the present invention may take the form of a hardware embodiment, a software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, flash memories, magnetic storage devices, and the like.

Computer program code or "code" for carrying out operations according to the present invention may be written in various programming languages such as mainframe Assembly, PL/X, or other third generation language environments. Software embodiments of the present invention do not depend on implementation with a particular programming language.

Figure 1:
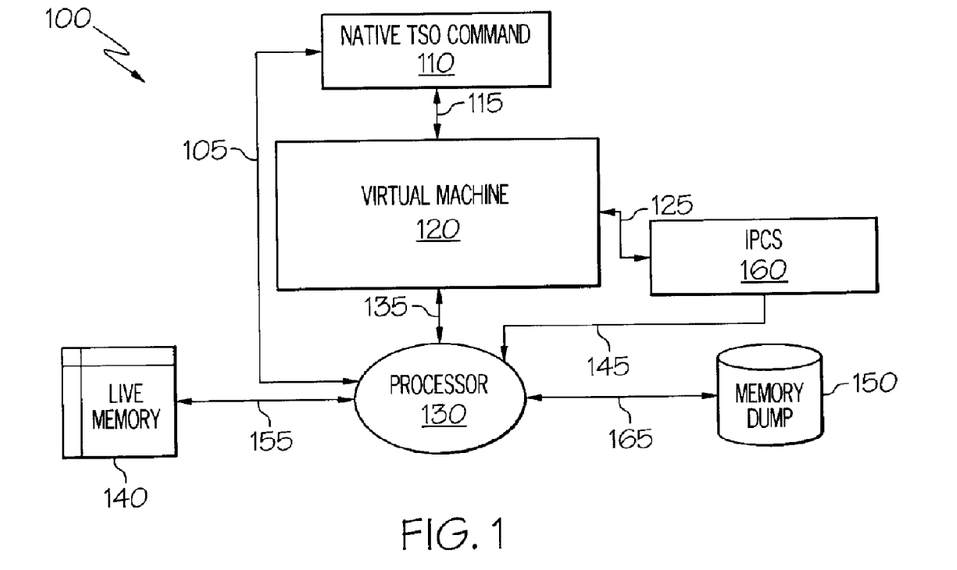
FIG. 1 illustrates a computer system in accordance with present invention.

FIG. 1 illustrates a computer system 100 in accordance with present invention. The computer system 100 includes hardware components such as a processor 130, live memory 140, memory dump file 150, and program code including a native TSO command 110 modified according to the teachings of the present invention, a virtual machine 120 according to the teachings of the present invention, and IPCS 160. When executing, the program code typically resides in live memory 140 but the program code components are illustrated separately for the sake of ease of illustration.

The computer system 100 may be a mainframe system such as a system/390, any of IBM's z series servers, or the like modified in accordance with the teachings of the present invention. The computer system 100 may run various operating systems including MVS, OS/390, z/OS, or the like. The native TSO command 110 is a command written in native mainframe Assembly, PL/X, or the like and is written to examine the memory structures of the contents of live memory 140. Furthermore, the native TSO command 110 has been modified according to the teachings of the invention and described in further detail in connection with the discussion of FIG. 2. The virtual machine 120, described in further detail in connection with the discussion of FIG. 3, executes a portion of the native TSO command 110 which typically locates a control block structure within live memory in the virtual machine's 120 own virtual memory environment. By executing the memory location portion of the native TSO command 110 in the virtual machine's 120 own virtual memory environment, the virtual machine 120 provides a service for the native TSO command 110 to gain access to other back end memory structures other than just live memory 140. In the exemplary system 100 illustrated in FIG. 1, the virtual machine 120 accesses a memory dump 150 through IPCS 160 by following the execution paths 125, 145 and data path 165. The virtual machine 120 utilizes execution path 135 when requesting the processor 130 to execute instructions requiring access to hardware components.

It should be noted that the native TSO command 110 may execute without the involvement of the virtual machine 120 when accessing live memory 140. In that scenario, execution path 105 and data path 155 are followed for the native TSO command 110. However, the native TSO command 110 may continue to operate on live memory through involvement with the virtual machine 120. In this scenario, all operations specified in the native TSO command 110 which are intended to access the processor 130 and live memory 140 are executed by the virtual machine 120 through execution path 115.

Figure 2:
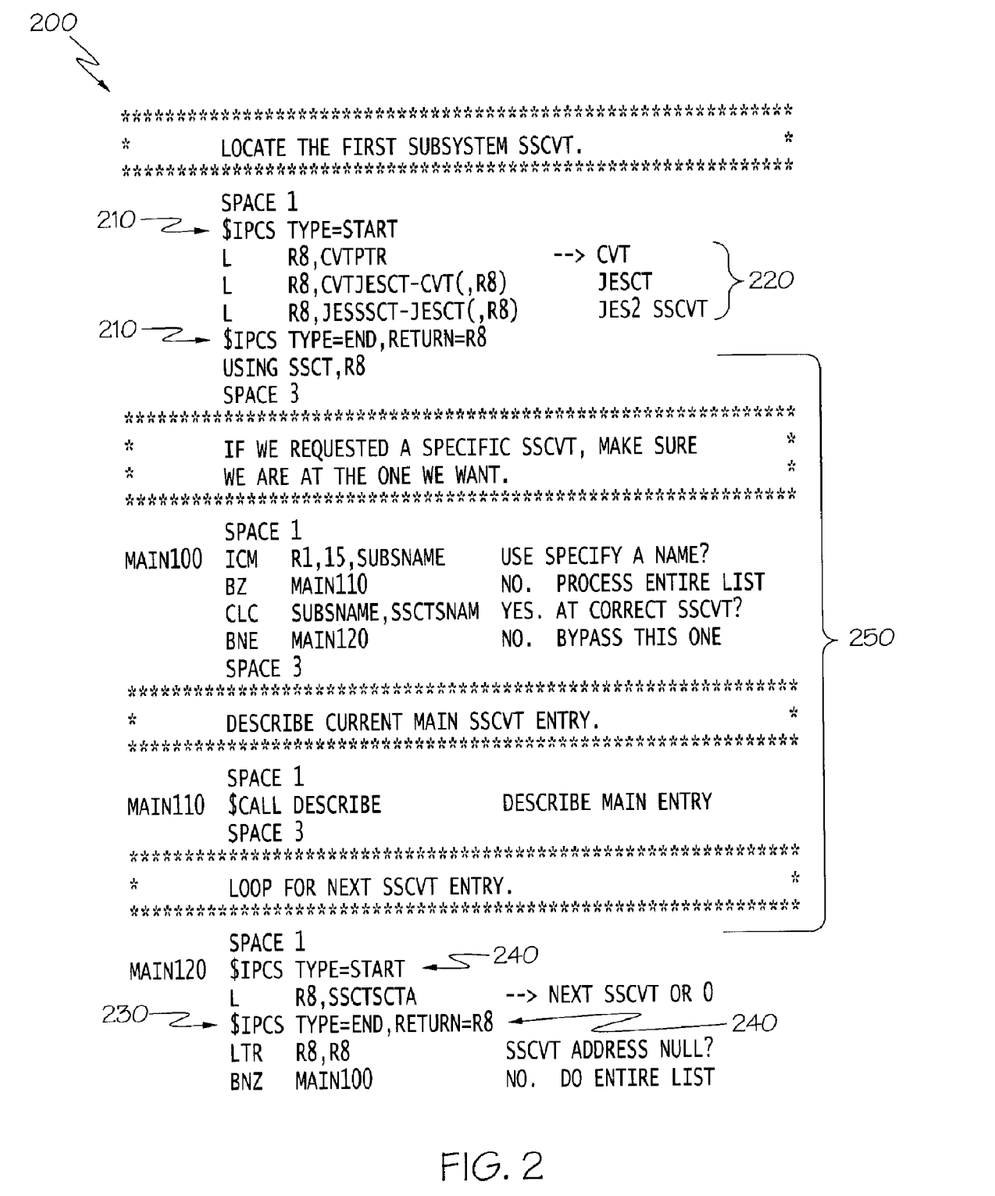
FIG. 2 illustrates an exemplary native TSO command modified according to the teachings of the present invention.

FIG. 2 illustrates an exemplary native TSO command 200 modified according to the teaching of the present invention. In general, a native TSO command can be logically separated into an initialization, locate, analyze and display, and termination code segments. Native TSO command 200 contains locate code segments 220 and 230 and an analyze and display segment 250. For the sake of simplicity, initialization and termination segments are not illustrated. It should be noted that although native TSO command 200 has been illustrated with two locate code segments, a native TSO command, in general, may have any number of locate code segments.

The modification to an existing native TSO command includes the insertion of macro pairs 210 and 240. Macro pairs 210 are inserted around locate code segment 220 to logically separate the locate code segment 220 which, when executed without macro pairs 210, locates a control block structure within live memory. Macro pairs 210 are indicia recognizable by the virtual machine. Macro pairs 210 are used to suitably invoke or transfer control to a virtual machine, such as virtual machine 120 of FIG. 1. The virtual machine then executes locate code segment 220 under the virtual machine's own operating environment. Consequently, locate code segment 220 from the point of view of the operating environment of the native TSO command 200 is dead code when the native TSO command 200 accesses a memory dump, for example. Alternatively, when the virtual machine determines that live memory should be accessed, the locate code segment 220 continues to execute in the operating environment of the virtual machine.

Similarly, macro pairs 240 are inserted around locate code segment 230. In general, an existing native TSO command may be modified by finding code segments whose function are to locate a memory structure in live memory. It should be noted, however, that someone skilled in the art of PL/X or Assembly programming may need to make small changes in existing native TSO commands which utilize aggregate functions which aggregate a locating function with another function. For example, the aggregate Assembly function statement:

ICM R8, 15, SSCTSCT should be divided into two statements:

L R8, SSCTSCTA

LTR R8, R8

Dividing an aggregate Assembly or PL/X function as shown above, macro pairs 240 can then surround the command "L R8, SSCTSCTA" as shown in FIG. 2 and logically separate a locate code segment.

Figure 3:
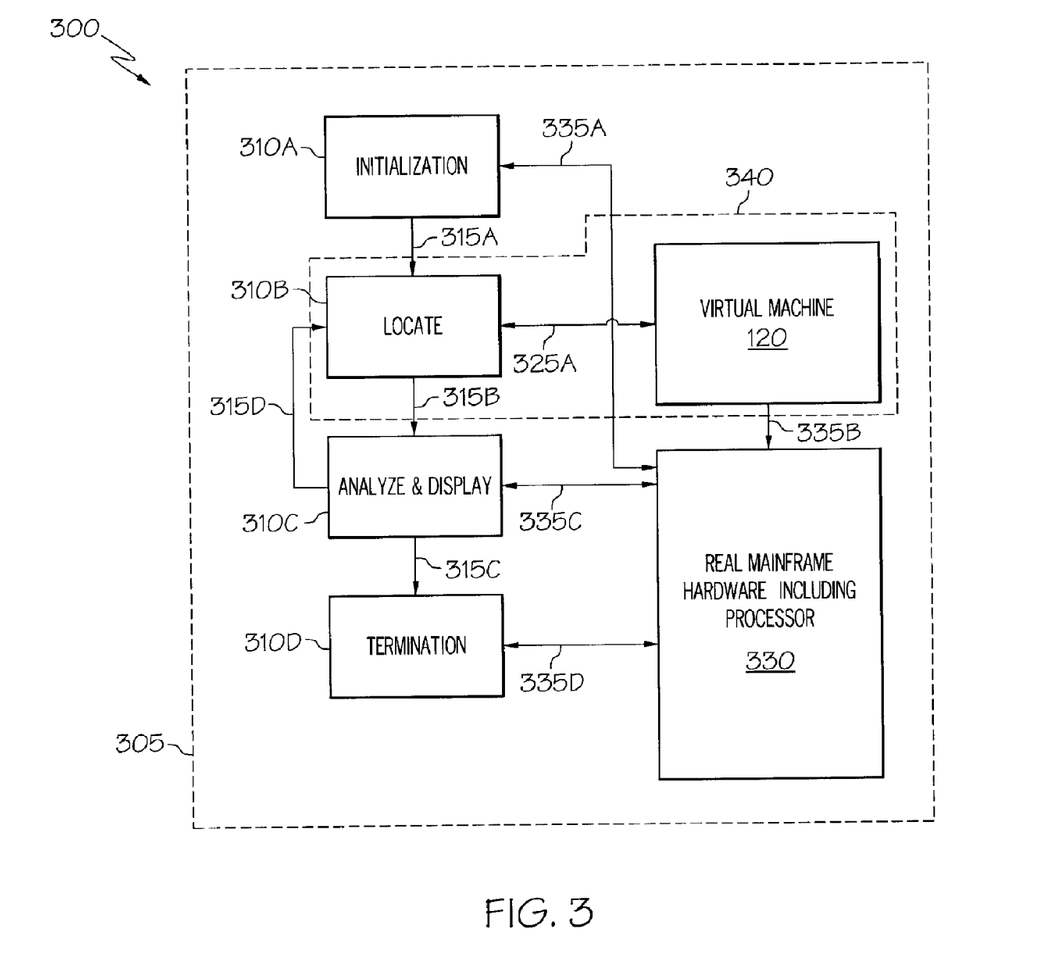
FIG. 3 illustrates a block diagram showing the different operating environments when invoking the different code segments of a native TSO command in accordance with the present invention.

FIG. 3 illustrates a block diagram 300 showing the different operating environments when invoking the different code segments 310A-310D of a native TSO command in accordance with the present invention. As described above, a native TSO command, in general, can be logically divided into four code segments: an initialization segment 310A, a locate segment 310B, an analyze and display segment 310C, and a termination segment 310D. The sequential execution flow of the native TSO command is illustrated by execution paths 315A, 315B, 315C, and 315D. Code segments 310A, 310C, and 310D are executed in real mainframe virtual memory 305, also referred to as live memory. The real mainframe virtual memory 305 is addressable memory space offered by a mainframe operating system to running programs. During the execution of code segments 310A, 310C, and 310D real machine instructions may need to be executed by real mainframe hardware 330. When doing so, code segments 310A, 310C, and 310D request real mainframe hardware services over execution paths 335A, 335C, and 335D. Real mainframe hardware 330 may suitably include a processor, I/O devices, and the like. When locate segment 310B, such as locate segment 220, is executed over execution path 325A, locate segment 310B is executed under the operating environment of virtual machine 120. In locating the actual data in a memory dump referenced in the locate segment 310B, virtual machine 120 may have its instructions executed by real mainframe hardware over execution path 335B.

One aspect of the operating environment of virtual machine 120 includes utilizing the virtual machine memory 340. Virtual machine memory 340 is memory allocated to the virtual machine 120. The virtual machine 120 requests allocations of computer system 100's live memory from the operating system in a conventional manner. Therefore, virtual machine memory 340 is a subset of live memory 140, obtained by virtual machine 120, and provided to a native TSO command, such as TSO command 200, as a replacement for the subset of live memory 140 that an unmodified native TSO command would have found on its own.

A native TSO command such as TSO command 200 may also advantageously access live memory when it is executed without virtual machine 120 or if virtual machine 120 recognizes that the TSO command 200 should access live memory. How virtual machine 120 recognizes whether to access live memory or another memory type will be described in further detail below in connection with the discussion of FIG. 4.

Figure 4:
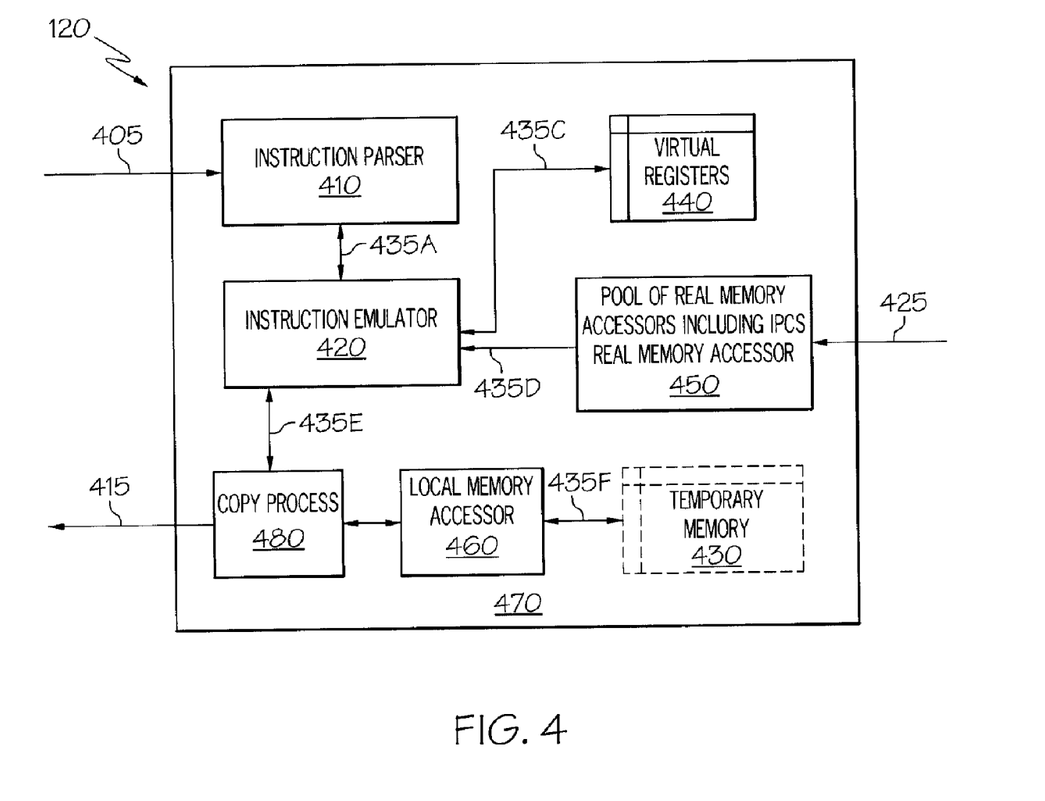
FIG. 4 illustrates a functional block diagram of the code components of the virtual machine of FIGS. 1 and 3.

FIG. 4 illustrates a functional block diagram of the code components of virtual machine 120 of FIGS. 1 and 3. The virtual machine 120 includes an instruction parser 410, an instruction emulator 420, temporary memory 430, virtual registers 440, pool of real memory accessors 450, a local memory accessor 460, and a copy process 480. In short, virtual machine 120 receives a locate code segment such as locate code segment 220, performs the functions of a mainframe processor, and returns a copy of a memory structure whether that memory structure resides in live memory, a memory dump file, or the like.

During initialization of virtual machine 120, virtual machine 120 polls the pool of real memory accessors 450. The first real memory accessor from the pool of real memory accessors 450 which respond to the poll and accept responsibility for the virtual machine's operating environment becomes the active real memory accessor. Each real memory accessor will have its own set of requirements which need to be satisfied before accepting responsibility. Additionally, a hierarchical approach may be employed so that one real memory accessor may evaluate its set of requirements before other real memory accessors have an opportunity to evaluate their requirements. Preferably, the real memory accessor corresponding to a memory dump, for example, evaluates its set of requirements first before other real memory accessors evaluate theirs. The set of requirements for the real memory accessor corresponding to a memory dump includes making a determination that the IPCS tool is running on the computer system 100. In a preferable way of making this determination, the real memory accessor looks for control block information that the IPCS tool has placed in live memory. If the control block information is in live memory, it is known that the IPCS tool is running and the real memory accessor corresponding to a memory dump may readily accept responsibility and become the active real memory accessor. If the control block information is not in live memory, the real memory accessor corresponding to live memory will unconditionally accept responsibility for the environment and become the active real memory accessor.

The functional components in FIG. 4 will now be described below in conjunction of with the exemplary native TSO command 200 of FIG. 2. The first macro of the macro pair 210 invokes the virtual machine 120. As such, locate code segment 220 is passed to the instruction parser 410 over execution path 405. The instruction parser 410 parses locate code segment 220 to determine which functional components in the virtual machine 120 need to be involved. For example, the command "L R8, CVTPTR" is a load command requesting that register eight (R8) be loaded with a four byte address of pointer CVTPTR. It should be noted that CVTPTR is a known declarative and is resolved to real memory location 0×10.

Consequently, the instruction parser 410 determines that virtual registers 440 will be needed to process the command. The output of instruction parser 435A is passed to the instruction emulator 420 over execution path 435A. Virtual registers 440 include sixteen virtual general registers and a program status word (PSW) construct which emulate corresponding hardware registers and a hardware PSW, respectively.

Determining how to find a real memory location in one particular type of real memory is often different than finding the same real memory location in another type of real memory. For example, finding memory location 0×10 in real memory is quite different than finding memory location 0×10 of the memory dump. Hence, the function of a real memory accessor is to find the location in its associated memory which corresponds to a base address. For example, the IPCS real memory accessor finds memory location 0×10 by utilizing the known EVAL and EVALSYM commands. Other real memory accessors may be written so that the virtual machine may access other back end memory types such as accessing a memory dump over a network.

The instruction emulator 420 has a 31-bit addressing architecture such as IBM's MVS SP2 (XA), for example. The instruction emulator 420 acts as a central processing unit and emulates the execution of assembly instructions including load, add, multiply, move, store, and the like. More specifically, the instruction emulator 420 has a 109 machine instruction subset of the OS/360 hardware architecture. However, in executing commands requiring access to hardware registers, the instruction emulator utilizes virtual registers 440, once primed from the hardware registers, rather than those hardware registers. The instruction emulator 420 utilizes the active real memory accessor from the pool of real memory accessors 450. Instruction emulator 420 outputs a single absolute number. For example, when instruction emulator 420 resolves an address the output is an absolute address.

Since the active real memory accessor is the IPCS real memory accessor in this example, the instruction emulator 420 requests the IPCS real memory accessor from the pool of real memory accessors 450 to access the memory dump 150 via IPCS tool 160. The instruction emulator 420 utilizes the data provided by the instruction parser 410 and the current contents of the virtual registers 400 to determine from where in the memory dump a control block is to be retrieved. For example, the IPCS real memory accessor, using IPCS provided commands EVAL and EVALSYM, retrieves the four byte address which resides at location 0×10 from a memory dump, as indicated by lead line 425 and returns the four byte address to instruction emulator 420 over execution path 435D. Over execution path 435C, the instruction emulator 420 writes the four byte address into emulated R8 in the virtual registers 440. The instruction emulator 420 executes the next two commands in locate code segment 220 which results in manipulating the contents of R8 with other declaratives which are resolved to absolute addresses. Thus, the IPCS real memory accessor is invoked again to traverse through the memory dump as specified by the two load commands to load R8 with a four byte address.

The second macro of the macro pair 210 causes the virtual machine 120 to retrieve the contents of emulated R8 in virtual registers 440. The instruction parser 410 parses the second macro of macro pair 210 and determines that copy process 480 is needed to return R8 to the operating environment of the native TSO command. Copy process 480 accesses emulated R8 of virtual registers 440. It should be noted that the address contents of emulated R8 of virtual registers 440 is an absolute address. The copy process 480 sends the absolute address to the active real memory accessor of the pool of real memory accessors 450 with a request to retrieve data, also referred to as a control block, which is pointed to by emulated R8. The data is typically on the order of 1024 bytes to 5632 bytes long. The copy process 480 requests that computer system 100 allocate temporary memory 430 to temporarily store the retrieved data. The copy process 480 then copies the contents of the retrieved data to temporary memory 430 via local memory accessor 460. Temporary memory 430 is a copy of the requested data found in the memory dump at the address referenced by virtual register 440's R8.

Temporary memory 430 is accessible to the native TSO command 200 operating environment. Thus, the data referenced by emulated R8 is returned to the native TSO command 200 and the native TSO command's own operating environment.

Since the native TSO command 200 is not responsible for accessing the hardware registers or real machine memory directly, different memory types may be accessed by the native TSO command 200 by simply adding a real memory accessor to the pool of real memory accessors 450 corresponding to a different memory type. Furthermore, since the analyze and display code segment of the native TSO command 200 is not modified, the native TSO command 200 still analyzes and displays the retrieved memory structures as before, eliminating the need to rewrite that portion of the TSO command.

Figure 5:
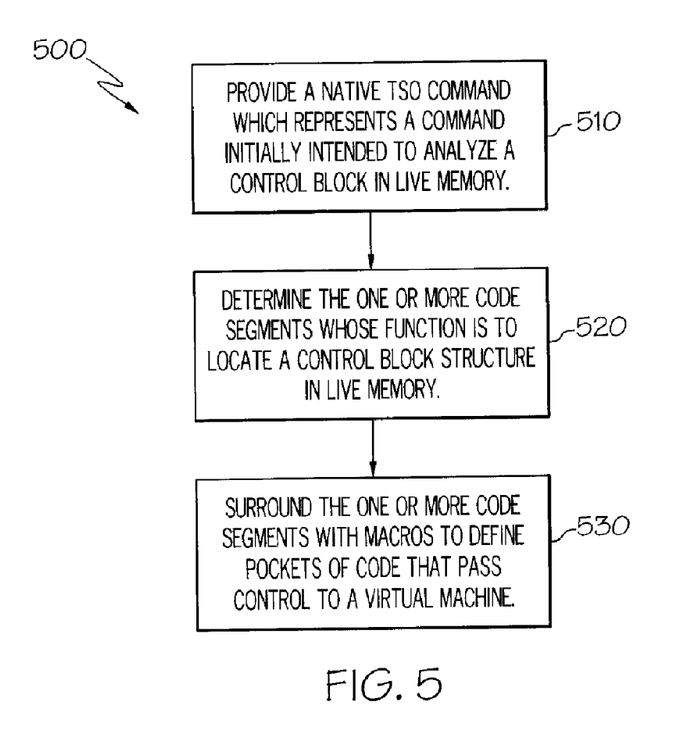
FIG. 5 is a flow chart illustrating a method for modifying existing native TSO commands so that they operate in the computer system of FIG. 1.

FIG. 5 is a flow chart illustrating a method 500 for modifying an existing native TSO command to operate in the computer system of FIG. 1. At step 510, the method 500 provides a native TSO command which represents a command initially intended to analyze a control block in live memory. At step 520, the method 500 determines the one or more code segments whose function is to locate a control block structure in live memory. At step 530, the method 500 macros are inserted around the one or more code segments to define pockets of code that pass control to a virtual machine. More particularly, for each locate code segment, a first macro is inserted at the beginning of a locate code segment and a second macro is inserted at the end of the locate code segment.

Figure 6:
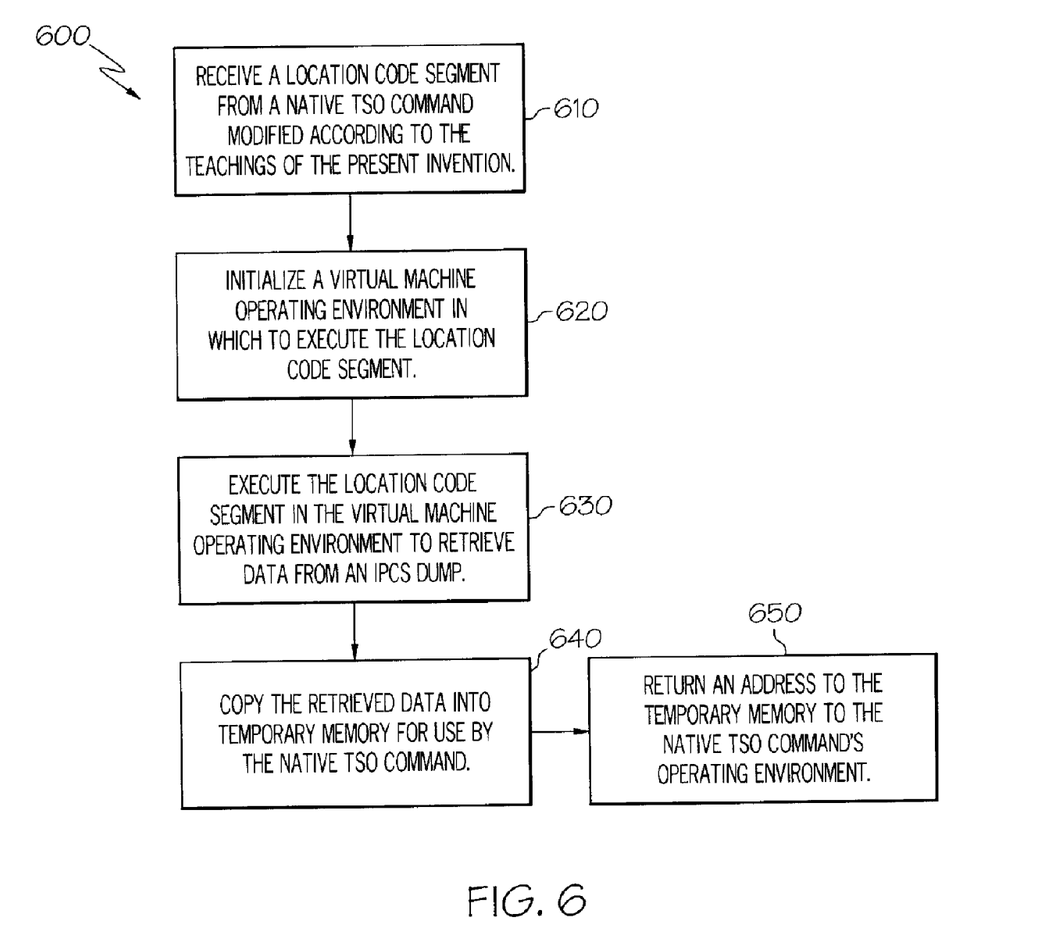
FIG. 6 is a flow chart illustrating the functional steps of the virtual machine of FIGS. 1 and 3.

FIG. 6 is a flow chart illustrating the functional steps of the virtual machine of FIGS. 1 and 3. At step 610, the method begins by receiving a locate code segment from a native TSO modified according to the teachings of the present invention such as native TSO command 200. At step 620, the method initializes a virtual machine operating environment in which to execute the locate code segment. During initialization, an active real memory accessor is determined. Step 620 may also occur before step 610. The virtual machine operating environment includes creating a virtual machine memory in which to operate the locate code segment. At step 630, the method executes the locate code segment in the virtual machine operating environment utilizing the virtual machine memory. Finding data in a memory type corresponding to the active real memory accessor results from executing the locate code segment. At step 640, the method copies the found data to temporary memory. At step 650, the method returns an address to the temporary memory to the native TSO command's operating environment. Upon completion of method 600, the native TSO command continues to operate on the data retrieved through the virtual machine independent of where the data originated.

While the present invention has been disclosed in the context of various aspects of presently preferred embodiments, it will be recognized that the invention may be suitably applied to other environments consistent with the claims which follow. Such environments include accessing different memory types or accessing a memory dump over a network. In the latter environment, the native TSO commands may run on a mainframe resident at the premises of a service provider and the memory dump may reside on a customer's mainframe system allowing the present invention to run as a remote memory analysis tool. In such an operation, service personnel may advantageously utilize the invention to provide remote technical support.

What is claimed is:

1. A method for analyzing a memory dump utilizing a modified live memory analysis command, the method comprising:

retrieving a memory command which, when executed, performs analysis on live memory, the command having first and second portions, the first portion, when executed, locates a first control block in live memory;

modifying the first portion to invoke a virtual machine for locating a second control block in a memory dump; and executing the modified portion to access the second control block.

2. The method of claim 1 wherein the executing step further comprises:

retrieving data from the second control block.

3. The method of claim 2 wherein the executing step executes in a virtual memory operating environment of the virtual machine, the method further comprising:

copying the second control block to temporary memory; and executing the second portion in a second operating environment, wherein the executing step accesses the temporary memory from the second operating environment.

4. The method of claim 1 wherein the memory command is a native TSO command.

5. The method of claim 1 wherein the modifying step further includes:
inserting a first macro at the beginning of the first portion; and
inserting a second macro at the end of the first portion.

6. The method of claim 1 further comprising:
initializing a virtual machine operating environment, wherein the executing step executes the modified portion in the virtual machine operating environment.

7. A computer system for analyzing memory types, comprising:
a memory containing:
a plurality of virtual registers for emulating real hardware registers in the computer system, a virtual register being initialized with a value stored in a corresponding real hardware register;
an instruction emulator for emulating the execution of instructions by the computer system, the instruction emulator utilizing one or more of the plurality of virtual registers when executing instructions requiring real hardware registers;
a plurality of real memory accessors, each real memory accessor finding a memory location in a corresponding memory type, one real memory accessor of the plurality of real memory accessors being an active real memory accessor; and
a processor for running the instruction emulator and the active real memory accessor.

8. The computer system of claim 7 wherein the active real memory accessor corresponds to a memory dump and accesses a memory location in the memory dump.

9. The computer system of claim 7 wherein the active real memory accessor corresponds to live memory and accesses a memory location in said live memory.

10. The computer system of claim 8 wherein the instruction emulator receiving instructions corresponding to a locate code segment of a live memory command.

11. A computer readable medium whose contents cause a computer system to analyze a memory dump utilizing a modified live memory command, by performing the steps of:
retrieving a memory command which, when executed, performs analysis on live memory, the command having first and second portions, the first portion, when executed, locates a first control block in live memory;
modifying the first portion to invoke a virtual machine for locating a second control block in a memory dump; and
executing the modified portion in the virtual machine to access the second control block.

12. The computer readable medium of claim 11 wherein the executing step further comprises:
retrieving data from the second control block.

13. The computer readable medium of claim 12 wherein the executing step executes in a virtual memory operating environment of the virtual machine, the method further comprising:
copying the second control block to temporary memory; and
executing the second portion in a second operating environment, wherein the executing step accesses the temporary memory from the second operating environment.

14. The computer readable medium of claim 11 wherein the memory command is a native TSO command.

15. The computer readable medium of claim 11 wherein the modifying step further includes:
inserting a first macro at the beginning of the first portion; and
inserting a second macro at the end of the first portion.

16. The computer readable medium of claim 11 further comprising:
initializing a virtual machine operating environment, wherein the executing step executes the modified portion in the virtual machine operating environment.

* * * * *